US009988098B2

(12) United States Patent
Padmanabhan et al.

(10) Patent No.: US 9,988,098 B2
(45) Date of Patent: Jun. 5, 2018

(54) HYBRID LAMINATED WOOD FLOOR WITH WOOD STRIPS ARRANGED IN A PATTERN FOR VEHICULAR TRAILERS

(71) Applicant: Havco Woods Products, LLC, Cape Giraedeau, MO (US)

(72) Inventors: Gopalkrishna Padmanabhan, Fenton, MO (US); James N. Vangilder, Jackson, MO (US); M. Bruce Bader, O'Fallon, IL (US)

(73) Assignee: HAVCO WOOD PRODUCTS, LLC, Cape Giraedeau, MO (US)

( * ) Notice: Subject to any disclaimer, the term of this patent is extended or adjusted under 35 U.S.C. 154(b) by 0 days. days.

(21) Appl. No.: 14/628,007

(22) Filed: Feb. 20, 2015

(65) Prior Publication Data

US 2015/0239508 A1    Aug. 27, 2015

Related U.S. Application Data

(60) Provisional application No. 61/944,043, filed on Feb. 24, 2014.

(51) Int. Cl.
*B62D 25/20* (2006.01)
*B32B 7/08* (2006.01)
(Continued)

(52) U.S. Cl.
CPC ............ *B62D 25/2054* (2013.01); *B32B 7/08* (2013.01); *B32B 7/12* (2013.01); *B32B 21/042* (2013.01); *B32B 2307/7145* (2013.01); *B32B 2439/00* (2013.01); *B32B 2605/00* (2013.01); *Y10T 428/24802* (2015.01)

(58) Field of Classification Search
CPC ..... B62D 25/2054; B62D 29/02; E04F 15/02; E04F 15/04; E04F 15/041; E04F 15/045; E04F 15/048
USPC ........ 52/390, 578, 581, 588.1, 589.1, 591.4; 428/50; 404/46; 296/184.1
See application file for complete search history.

(56) References Cited

U.S. PATENT DOCUMENTS 5,040,582 A * 8/1991 Hsu .......................... B27D 1/04
                                                        144/346
6,179,942 B1 * 1/2001 Padmanabhan ......... B32B 21/08
                                                        156/153

(Continued)

OTHER PUBLICATIONS

Cassens et al., "Yellow-Poplar Lumber for Exterior Architectural Applications in New Construction and for Historical Restoration"; Purdue University; Apr. 9, 2009; pp. 1-6.

(Continued)

*Primary Examiner* — Charles A Fox
*Assistant Examiner* — James J Buckle, Jr.
(74) *Attorney, Agent, or Firm* — Ohlandt, Greeley, Ruggiero & Perle, LLP (57) ABSTRACT

A hybrid laminated wood floor for cargo-carrying truck trailers, truck bodies and containers is provided. The hybrid laminated wood floor is formed from two or more different types of hardwood strips that are mixed in a controlled manner and arranged in a pattern. The hardwoods are selected to provide a difference in the average density of the wood types. The hybrid wood floor provides weight reduction and cost savings as compared with a conventional laminated wood floor made of a single type of wood, such as oak or hard maple.

14 Claims, 8 Drawing Sheets

(51) Int. Cl.
*B32B 7/12* (2006.01)
*B32B 21/04* (2006.01)

(56) References Cited

U.S. PATENT DOCUMENTS

| | | | | |
|---|---|---|---|---|
| 7,765,758 | B2 * | 8/2010 | Chorney | B62D 25/2054 296/191 |
| 2001/0003623 | A1 * | 6/2001 | Padmanabhan | B32B 21/08 428/479.6 |
| 2005/0266200 | A1 * | 12/2005 | Padmanabhan | B05D 7/06 428/54 |
| 2006/0032168 | A1 * | 2/2006 | Thiers | E04F 15/02 52/390 |
| 2006/0179733 | A1 * | 8/2006 | Padmanabhan | B32B 21/08 52/177 |
| 2007/0193179 | A1 * | 8/2007 | Risi | B32B 3/12 52/591.4 |
| 2011/0045243 | A1 * | 2/2011 | Dossche | B27N 3/00 428/141 |
| 2011/0179740 | A1 * | 7/2011 | Padmanabhan | B62D 25/2054 52/588.1 |
| 2011/0291441 | A1 | 12/2011 | Burton | |
| 2013/0014464 | A1 * | 1/2013 | Risi | B62D 29/02 52/592.1 |
| 2014/0000201 | A1 * | 1/2014 | Lu | B62D 25/2054 52/390 |

OTHER PUBLICATIONS

The American Hardwood Export Council; "The Illustrated Guide to American Hardwood Lumber Grades"; date unavailable; pp. 1-24.
TMC Recommended Practice; "12-Year Life North American Laminated Hardwood Flooring for Dry Freight Van Trailers"; Mar. 2007; pp. 1-10.
Western Wood Products Association—Technical Services Division; "NDS 2005 Specific Gravity Values for MSR Lumber"; Dec. 2008; pp. 1-2.
MSR Lumber; "Machine Stress-Rated Lumber: Quality Control, Availability, Specifying, Code Acceptability"; date unavailable; pp. 1-4.
Canadian Office Action dated Apr. 29, 2016 for Canadian application No. 2,882,849.
Canadian Office Action dated May 29, 2017 from corresponding Canadian Patent Application No. 2,882,849, 4 pages.

\* cited by examiner

HYBRID LAMINATED WOOD FLOOR WITH WOOD STRIPS ARRANGED IN A PATTERN FOR VEHICULAR TRAILERS

RELATED APPLICATION

This application claims the benefit of U.S. Provisional Application Ser. No. 61/944,043, filed on Feb. 24, 2014, which is incorporated herein by reference.

BACKGROUND OF THE DISCLOSURE

1. Field of Disclosure

The present disclosure relates to hybrid laminated wood flooring for cargo-carrying truck trailers, truck bodies and containers. The hybrid wood flooring has one or more portions having two or more types of hardwood strips, wherein the strips are arranged in a pattern. The types of wood strips are selected to provide weight and cost savings over traditional laminated hardwood flooring made of a single type of wood such as oak (red and white) or maple (hard and soft). The hybrid wood flooring may comprise one or more sections composed of a type of hardwood strips having an average specific gravity of 0.6 or higher and another type of hardwood strips with an average specific gravity less than 0.6, the specific gravity measured at 12 percent moisture content and at least one type of hardwood strips are arranged in a pattern.

2. Description of Related Art

Conventional wood flooring for over-the-road closed van trailers, truck bodies and containers is normally manufactured with hardwoods, such as oak, maple, birch, beech, ash, and the like. The green lumber used as a starting material in such manufacture is suitably dried to about 8% moisture content in special drying chambers under controlled conditions or by air drying followed by kiln drying. The dried lumber is then sawed into strips of rectangular cross-section and defective portions are eliminated by cross cutting the strips. During the cross-cutting process, "hooks" are formed at the ends of the lumber strips. Alternatively, other shapes such as fingers, bevel, tongue, groove, and the like, may be incorporated at the strip ends to make suitable joints in the floor. These shapes are primarily designed to form a connection or joint between ends of strips with or without an adhesive. The relatively defect-free lumber strips are coated on their vertical sides or edges with an adhesive such as melamine formaldehyde or polyvinyl acetate. The glue coated lumber strips are then assembled on a conveyor by placing them side to side and behind other strips, which were previously assembled to form rows of wood strips. The adhesive is cured by applying heat and pressure to large sections of the assembled lumber strips thus forming a unitary panel. During the assembly of the lumber strips, "end-joints" are formed at the ends of the strips with hook, finger, bevel, tongue or groove shaped ends. These joints are usually simple mechanical couplings with no significant adhesive bonding. Glue or sealant may be applied at the ends of sticks to provide adhesive bonding and sealing at the end joints.

The glued laminated wood is cut to a desired length (up to about 60 feet) and width (about 6 to 18 inches) to form floorboards. Most boards are 10 to 13 inches wide, and about 20 to 53 feet in length. The boards are then planed to a desired thickness and shiplaps and crusher beads are machined at the longitudinal edges of the boards. A shiplap is a rectangular projecting lip running along the length at an edge of a floorboard. Typically, the lip extends along the width of a board by about ⅜" to ½" and has about half the thickness of the board. A "top shiplap" has the lip extending from the top half thickness of the board. Similarly, a "bottom shiplap" has the lip at the bottom half of the board. The crusher bead is a small semi-circular projection running along the length on the edge of a board and placed over or below a lip. When the floorboards are assembled in a trailer such that the side edges of corresponding boards are squeezed together, the top and bottom shiplaps of adjacent boards overlap to form a seam or shiplap joint. The shiplap joint between adjacent boards helps to transfer some of the load from one board to its adjacent board. The board joint also helps to prevent the entry of road debris and water into the trailer. The crusher beads provide spacing between adjacent boards and help in preventing buckling of the boards due to expansion of board on absorption of moisture. Wood putty is applied at the end joints of strips on the top and bottom surfaces of the boards to fill any resident gaps. Finally, the underside and lateral sides of the floor boards are coated with a water-based latex polymeric coating, which is generally referred to as "undercoating" or "board coating" to provide moisture protection. The coating is usually applied by spraying. The boards may also be treated with a fungicide, wax coating, top coating, sealer coating or other polymeric coating to improve their service performance. The finished floorboards are packaged as kits, by stacking one board on top of another, with about eight boards per kit for installation in over-the-road trailers, truck bodies and containers, herein generally referred to as "trailers". Normally, a kit consists of two boards with special edge profiles to fit along the road and curb sides of a trailer. The other boards may be identical in design and are placed between the road-side and curb-side boards. All the boards are supported by thin-walled cross-members of I, C or hat sections, each having an upper flange, which span the width of the trailer and are spaced along the length of the trailer. Each floor board is secured to the cross-members by screws extending through the thicknesses of the board and the upper flanges of the cross-members.

Oak and hard maple hardwood-based laminated wood flooring is popularly used in truck trailers since it offers many advantages. The surface characteristics of oak and hard maple hardwoods such as high wear resistance and traction are most desirable. The strength and stiffness of the flooring is important for efficient and safe transfer of the applied loads to the cross-members of the trailer. The shock resistance of wood is useful to withstand any sudden dropping of heavy cargo on the floor. Nail holding capability and ability to absorb small amounts of water, oil or grease without significantly affecting traction are yet additional favorable properties of hardwood flooring.

Fruehauf Corporation quality standard is well known in the trailer industry as the developer of standards for traditional hardwood flooring. This standard has been broadly adopted in the industry by various trailer and flooring manufacturers. This standard specifies that "Species of lumber shall be as listed below with mixture of specie between categories not permitted. Lumber shall be quarter sawn with appropriate minimum specific gravity of 0.6 at 12 percent moisture content." Further, the standard specifies that Category I of the lumber shall be white and red oak; Category 2 shall be pecan and hickory or pecan, hickory, beech, birch, locust and elm; and Category 3 shall be hard maple. It is known in the industry that typical maple flooring may comprise a mixture of hard and soft maple strips even though the soft maple is not permitted. Soft maples typically have a specific gravity less than 0.6. Maple floors can have a mix of hard and soft maple strips, but it is difficult to visually differentiate the two types of wood strips for the common person. It requires the assistance of skilled technicians well versed with characteristics of wood species to visually identify the maple specie in a quick manner. Therefore, during production of maple flooring, the various maple strips are randomly mixed in the floor boards by typical workers in the flooring plant without consideration to develop any pattern of the strips in the floorboard based on their characteristics. Similarly, red and white oak are randomly mixed to make oak flooring for trailers because they are not easy to differentiate in the fast paced production environment.

SUMMARY OF THE DISCLOSURE

The goal of the present disclosure is generally to provide weight reduction and/or to lower the cost of the hardwood floor compared to traditional laminated oak floor for trailers, which is made with red or white oak or both. To achieve this goal, two or more different types of hardwoods are mixed in a controlled manner to make the inventive hybrid floor boards. Further, the different types of hardwoods are selected such that there is a difference in the average density of the wood. By choosing a denser wood such as oak and lighter wood such as poplar or soft maple or both, the average weight of the floor can be reduced compared to a traditional oak floor. The cost of the hybrid floor can be reduced by using a less costly wood such as poplar in combination with a more costly wood such as oak compared to the cost of traditional oak floor. Further, the wood types are chosen so that the general appearances of the types of wood or their color or grain or texture or any artificial marking applied to the strips can be identified by typical factory worker in order to assemble at least one type of wood strips in a regular pattern. Red and white oak look very similar to the untrained eye in a production or assembly environment and include dozens of sub-species of oak. Hard maple and soft maple are also difficult to distinguish easily by a typical factory worker during the wood strip assembly process at the time of laminating the strips of wood. Therefore, these commonly used types of hardwoods strips are randomly mixed and irregularly arranged to make traditional floor boards.

The term "hybrid wood board" or "hybrid floor board" shall be understood to be a wood board comprising two or more types of wood strips in an area of the board, at least one type of wood strips having generally distinguishable quality of color or grain or texture or appearance or any applied marking or average specific gravity compared to the other types of wood, wherein at least one type of wood strips are arranged in a pattern in the board. The term "hybrid wood floor" or "hybrid floor" is a floor comprising a plurality of wood boards assembled to form a floor with at least one hybrid wood board. Due to the readily distinguishable appearance of the types of wood strips, the different woods strips can be assembled during laminating of the strips for floor production to create a pattern of rows of strips in the floor board. The term "pattern" shall be understood to be an arrangement of wood strips in an area of a hybrid floor board measuring at least about three feet in length and any width of the floor board ranging from six to sixteen inches, the area comprising two or more types of wood strips, wherein one or more types of wood strips are in a regular or repeating arrangement.

A pattern can be such that a first type and a second type of hardwood strips are set in alternating rows, where the rows are side by side in a portion of the hybrid floor board. Another arrangement can be such that the alternating rows of hardwood strips are in the middle of the hybrid board and the edges of the board have the same type of hardwood strips. Yet another arrangement can have double rows of a first type of hardwood strips alternating with double rows of a second type of hardwood strips. Even another arrangement can be alternating strips of a first type of hardwood and a second type of hardwood in the middle area of the board while the edges comprise multiple rows of the first type of hardwood. Further, another arrangement can be rows of a first type of hardwood in the middle area of the board forming distinctly identifiable ribs, whereas the remaining strips are any other hardwood.

In this disclosure, the wood types to be mixed have easily distinguishable color or grain or texture or appearance or any applied marking or average specific gravity so that the mixing of the wood components can be suitably controlled during factory production of hybrid floor boards. Examples of such combinations of hardwoods include, but are not limited to the combinations of red oak-poplar, white oak-poplar, mixed oak-poplar, red oak-soft maple, white oak-soft maple, mixed oak-soft maple, oak-birch, oak-beech, hickory-poplar and the like. Another example of hardwood combinations includes a first type of wood such as oak and a second type of wood such as a mix of soft maple, poplar, and birch. Oak (red, white, or mixed oak) and poplar combination has a distinct advantage when making trailer flooring, which is an inventive subject matter. Both oak and poplar are hardwoods and their lumber boards are made, graded and sold similarly by sawmills and the prices for oak and poplar are significantly different for the same grade of lumber. Both hardwoods are available in plentiful quantities, which make it easy to source these two types of lumber in large and economical quantities for making trailer flooring.

DETAILED DESCRIPTION OF THE DISCLOSURE

Figure 1A:
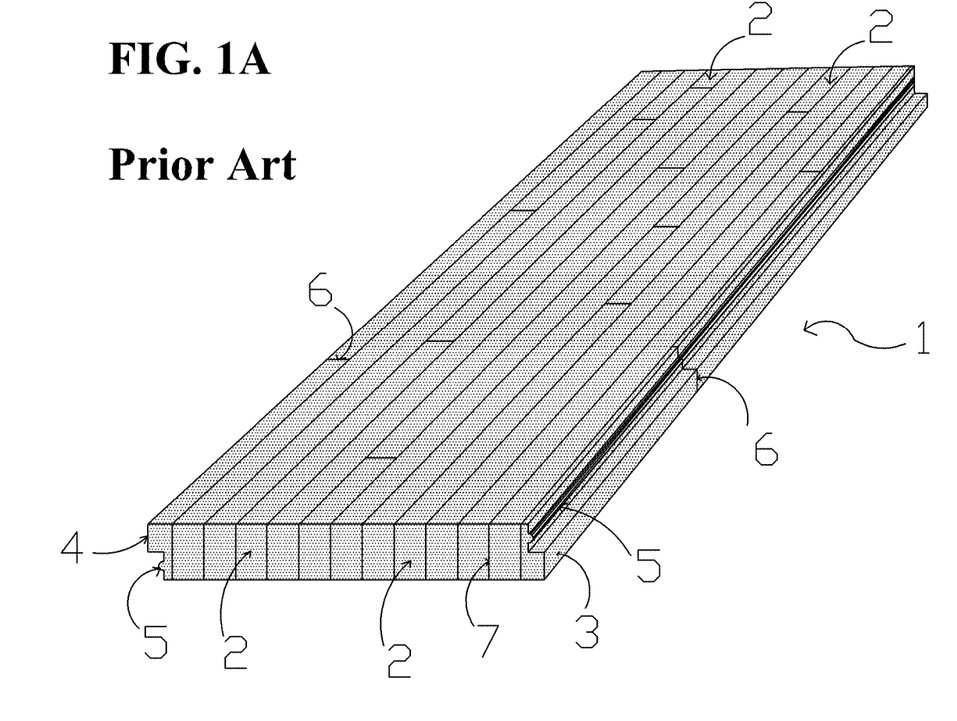
FIG. 1A is a portion of a traditional wood floor board (prior art) used in vehicular flooring having one or more types of wood strips in random arrangement.

Referring to FIG. 1A, conventional wood floor board 1 for over-the-road truck trailers and containers is normally manufactured with hardwoods such oak, maple, birch, beech and the like, although softwoods such as pine, Douglas fir and spruce can be employed. A wood floor board is composed of many wood strips 2, each with a length less than about 10 feet. The wood strips are edge-glued to form a unitary board measuring 6 to 18 inches wide and up to about 60 feet in length. The ends of the wood strips are shaped in the form of a hook, butt, finger or other mechanical or adhesive joint to make a longitudinal connection or end-joint 6 with other strips at the front end and back end of the wood strips.

Figure 1B:
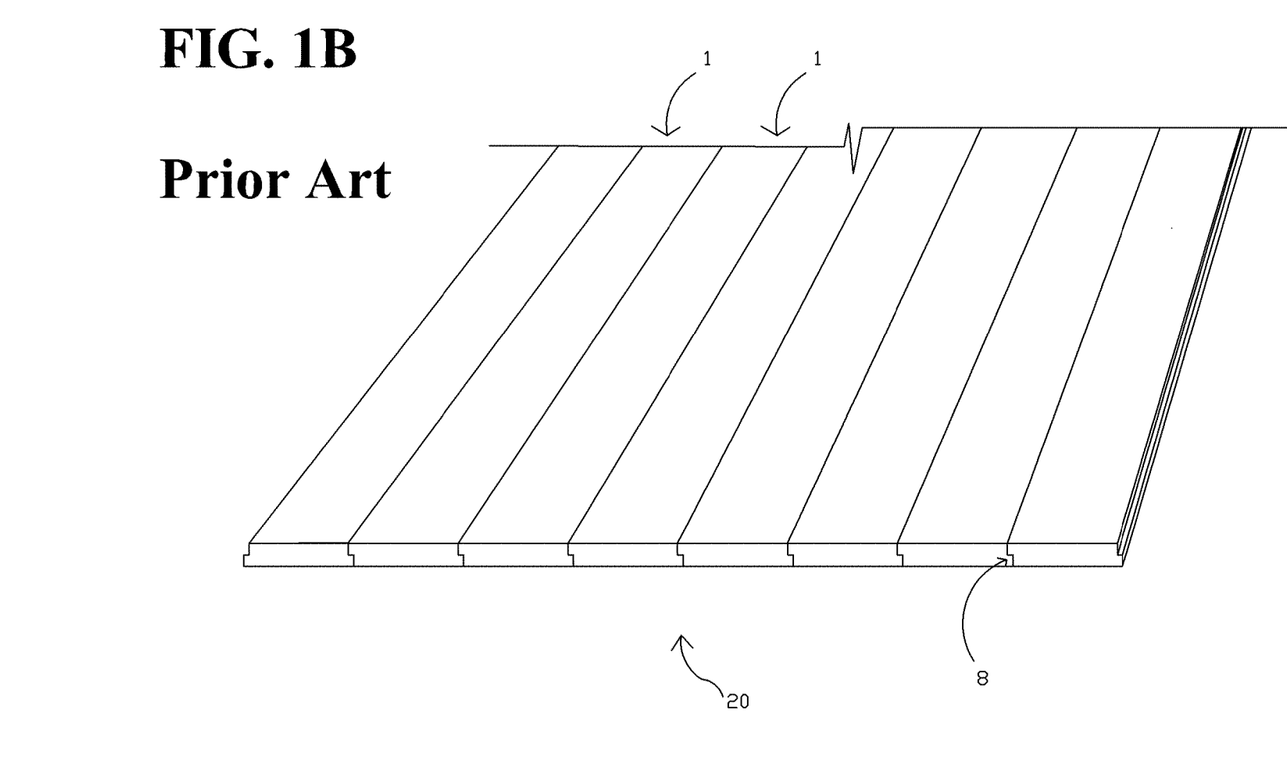
FIG. 1B is a portion of a traditional wood floor in a trailer (prior art), wherein the floor comprises a plurality of floor boards assembled side-by-side by means of shiplap joint between adjacent boards.

A shiplap 3, 4 is a rectangular projecting lip running along the length at an edge of a floorboard. Typically, the lip extends along the width of a board by about ⅜" to ½" and has approximately half the thickness of the board. A "top shiplap" 4 has the lip extending from the top half thickness of the board. Similarly, a "bottom shiplap" 3 has the lip at the bottom half of the board. The crusher bead 5 is a small semi-circular projection running along the length of an edge of a board and placed above or below a lip. A typical floor board can have about eight to about fourteen rows of wood strips adjacent to one another across the width of the board. A glue joint 7 is present between the adjacent rows of strips of wood. Referring to FIG. 1B, when the floorboards are assembled side-by-side in a trailer to make a wood floor 20 such that the side edges of corresponding boards are squeezed together, the top and bottom shiplaps of adjacent boards overlap to form a seam or a shiplap joint 8. The shiplap joint between adjacent boards helps to transfer some of the load from one board to the adjacent board. The crusher beads provide spacing between adjacent boards and help to prevent the buckling of the boards due to expansion on absorption of moisture by wood. Putty is applied at the end-joints 6 of wood strips of the boards to fill any resident gaps. All the boards are supported by thin-walled cross-members of I, C or hat sections in a trailer, each cross-member having an upper flange, which span the width of the trailer and are spaced along the length of the trailer. Each floor board is secured to the cross-members by screws extending through the thicknesses of the board and the upper flanges of the cross-members.

Commercially available maple floors can have a mix of hard and soft maple strips. It is difficult to visually differentiate the two types of maple wood strips for the common person or typical factory worker in a quick manner. It requires the assistance of skilled technicians well versed with the characteristics of wood species to identify hard and soft maple wood types. Therefore, during the production of maple flooring, the various types of maple strips are randomly mixed in the floor boards by typical workers in the flooring plant without consideration to develop any pattern of the strips in the floorboard based on their characteristics. Similarly, red and white oak are randomly mixed to make oak flooring for trailers because they are not easy to differentiate in the fast paced production environment. Traditional flooring for trailers may also be made with hard maple, red oak or white oak only.

The goal of the present disclosure is generally to provide weight reduction and/or to lower the cost of the wood floor compared to traditional laminated oak floor for trailers, which is made with red or white oak or both. To achieve this goal, two or more different types of hardwoods are mixed in a controlled manner to make the inventive hybrid floor boards. Further, the different types of hardwoods are selected such that there is a difference in the average density of the wood types. By choosing a denser wood such as oak and lighter wood such as poplar or soft maple or both, the average weight of the floor can be reduced compared to a traditional oak floor. The cost of the floor can be reduced by using a less costly wood such as poplar in combination with a more costly wood such as oak compared to the cost of traditional oak floor. Further, the wood types are chosen so that the general appearances of the types of wood or their color or grain or texture or appearance or any applied marking can be identified by typical factory worker making the inventive hybrid floor. Red and white oak look very similar to the untrained eye in a production or assembly environment and include dozens of sub-species. Hard maple and soft maple are also difficult to distinguish easily by a typical factory worker during the wood strip assembly process at the time of laminating the strips of wood. Therefore, these types of hardwood strips are randomly mixed and irregularly arranged to make traditional floor boards.

The term "hybrid wood board" or "hybrid floor board" shall be understood to be a wood board comprising two or more types of wood strips in an area of the board, at least one type of wood strips having generally distinguishable quality of color or grain or texture or appearance or any applied marking or average specific gravity compared to the other types of wood, wherein at least one type of wood strips are arranged in a pattern in the board. The term "hybrid wood floor" or "hybrid floor" is a floor comprising a plurality of wood boards assembled to form a floor with at least one hybrid wood board. Due to the readily distinguishable appearance of the types of wood strips, the different woods strips can be assembled during laminating of the strips for floor production to create a pattern of rows of strips in the floor board. The term "pattern" shall be understood to be an arrangement of wood strips in an area of a hybrid floor board measuring at least about three feet in length and any width of the floor board ranging from six to sixteen inches, the area comprising two or more types of wood strips, wherein one or more types of wood strips are in a regular or repeating arrangement.

A pattern can be such that a first type and a second type of hardwood strips are set in alternating rows, where the rows are side by side in a portion of the hybrid floor board. Another arrangement can be such that the alternating rows of hardwood strips are in the middle of the hybrid board and the edges of the board have the same type of hardwood strips. Yet another arrangement can have double rows of a first type of hardwood strips alternating with double rows of a second type of hardwood strips. Even another arrangement can be alternating strips of a first type of hardwood and a second type of hardwood in the middle area of the board while the edges comprise multiple rows of the first type of hardwood. Further, another arrangement can be rows of a first type of hardwood in the middle area of the board forming distinctly identifiable ribs, whereas the remaining strips are any other hardwood.

In this disclosure, the wood types to be mixed have easily differentiable color or grain or texture or appearance or any applied marking or average specific gravity so that the mixing of the wood components can be suitably controlled during factory production of hybrid floor boards. Examples of such combinations include, but are not limited to the combinations of red oak-poplar, white oak-poplar, mixed oak-poplar, red oak-soft maple, white oak-soft maple, mixed oak-soft maple, oak-birch, oak-beech, hickory-poplar and the like. Another example of hardwood combinations includes a first type of wood such as oak and a second type of wood such as a mix of soft maple, poplar, and birch. Oak (red, white, or mixed oak) and poplar combination has a distinct advantage when making trailer flooring, which is an inventive subject matter. Both oak and poplar are hardwoods and their lumber boards are made, graded and sold similarly by sawmills and the prices for oak and poplar are significantly different for the same grade of lumber. Both hardwoods are available in plentiful quantities, which make it easy to source these two types of lumber in large and economical quantities for making trailer flooring.

Table 1 below is list of green (not dry) lumber prices published by Hardwood Market Report dated Jan. 3, 2014. The grade chosen for this comparison is #2A or #2A Com or 2Com, which is typically used for making trailer flooring for economic reasons. The thickness of the lumber considered here is 4 quarter (4/4), which is readily available at the actual thickness of 1.0 to 1.12 inch in the un-dried or green stage. A board foot (bdft) of lumber is a volumetric measure of lumber having a surface area of 1 square foot and thickness of 4 quarter. The sawmill price is normally quoted for a thousand (1000) board foot. The market prices vary based on region and the demand for lumber, but this table provides a general comparison among hardwoods.

TABLE 1

Prices for Grade #2A Lumber (Appalachian Region)

| Type | Price per thousand bdft (Mbdft) | Specific Gravity |
|---|---|---|
| Ash | $350 | 0.49-0.6 |
| Beech | $345 | 0.64 |
| Birch | $315 | 0.55-0.65 |
| Hickory | $520 | 0.60-0.75 |
| Hard Maple | $765 | 0.57-0.63 |
| Soft Maple | $410 | 0.47-0.54 |
| Red Oak | $700 | 0.59-0.69 |
| White oak | $660 | 0.63-0.88 |
| Poplar | $355 | 0.42 |

It is clear from Table 1 that ash, beech, birch, soft maple, and poplar are significantly less costly than hard maple, hickory, red oak and white oak. A lower cost floor can be produced by using oak (red, white or both) with another type of wood such as poplar, for example. Other combinations of different types of woods are possible to lower average cost of materials.

According to the Wood Handbook—Wood as an Engineering Material, which is published by the USDA Forest Service, yellow-poplar, commonly referred to as poplar has a specific gravity of 0.42 at 12 percent moisture content (see Table 1). Other properties for poplar, which are important to the performance of this wood in trailer flooring application are discussed below at the same 12 percent moisture content. Poplar has a modulus of rupture (MOR), which is also known as bending strength of 10,100 pounds per square inch (psi). The modulus of elasticity (MOE), which is also known as bending modulus is 1.58 million psi for poplar. The side hardness of poplar is 540 pounds. Compared to poplar, oaks are classified into red and white oaks and further, each group of oak has several sub-types or sub-species. The specific gravity of oak ranges between 0.59 to 0.88. Southern red oak, which has the low specific gravity of 0.59 and live oak, which has a high specific gravity of 0.88 are less commonly used for making trailer floor. However, chestnut, among other oaks, is a commonly used oak for making trailer floors and therefore it is used here as an example for comparison with poplar. The specific gravity of chestnut oak is 0.66, MOR is 13,300 psi, MOE is 1.59 million psi and side hardness is 1130 pounds. The resistance of wood screw shanks to withdrawal from the side grain of seasoned wood varies directly with the square of the specific gravity of the wood. Screw withdrawal resistance is a useful property for properly attaching the floorboard to the cross-members of the trailer.

Random mixing and irregular patterning of a lighter, weaker and softer (having lower side hardness) type of hardwood strips such as poplar with a heavier, stronger and harder type of hardwood strips such as chestnut or other oaks to make trailer floor can produce a board with widely varying characteristics, which is not suitable for use in trailers. Selective mixing of oak and poplar strips and creating a pattern of the rows of hardwood strips of two types of hardwood in the floorboard can overcome this problem. Laying the strips of oak and poplar in a pattern during assembly of wood strips for lamination or gluing can produce a hybrid floor board with more controllable characteristics and desirable aesthetic qualities. The lower hardness of poplar strips can be offset by the higher hardness of oak strips by means of forming a pattern with the rows of oak and poplar strips. The ability to produce a hybrid floorboard by selective mixing of wood types and making a pattern of wood strips to reduce variation in unit weight (weight per square foot of floor board) or strength or resistance to indentation is one of the inventive embodiments disclosed herein.

The cost of producing a hybrid floor board is lower than producing a traditional floorboard with hard maple or oak. For example, #2A grade of oak (red and white) lumber is available for about $660 to $700 per thousand board feet (Mbdft) in the Appalachian region, which leads to an average price of about $680. Poplar, which is a lighter hardwood than oak is available for about $355 per Mbdft in the Appalachian region. The cost of transporting the lumber can be lower for poplar because of its lower specific gravity than the oak. Further, cost savings are achieved due to fast drying characteristics of poplar, which means the flooring producer does not have to carry very large inventory of poplar to meet a surge in market demand. For example, it takes significant investment in drying warehouse and kilns to dry oak in about 60 days, whereas poplar can be dried in about 10 days due to its natural drying characteristics. By mixing oak and poplar lumber at the approximate ratio of 1 to 1, the average cost of lumber is $518 per Mbdft. The oak-poplar mix provides cost savings of about $163 per Mbdft of lumber used to make the hybrid flooring compared to traditional oak flooring. Approximately 24% reduction in cost of lumber can be achieved for the hybrid floorboard by mixing oak and poplar than the traditional oak floor. Further the weight of flooring can be reduced due to the lower specific gravity of poplar than oak. The unit weight of oak is about 3.9 pounds per bdft at about 8 percent moisture content, whereas the unit weight of poplar is about 2.8 pounds per bdft at about the same moisture content. The hybrid oak-poplar boards with about similar proportion of oak and poplar weighs about 3.4 pounds per bdft.

Mixing hard maple and soft maple provides cost advantage compared to using just using hard maple to make trailer flooring. Hard and soft maples are difficult to differentiate for a typical factory worker in the production environment and therefore they are randomly mixed, which can lead to concentrated pockets of one type of lumber. The floorboard can have high concentration of soft maple in some parts of the flooring, which is not desirable. The sections of floorboard with a higher concentration of the soft maple can have lower strength and lower mechanical properties than a section of the floorboard that has a high concentration of hard maple. The higher mechanical properties of hard maple are generally correlated to the higher density of this type of wood compared to soft maple.

Mixing birch and oak provides cost advantage, but random mixing of the wood strips in irregular pattern can lead to larger variations of the strength, appearance and wear or surface indentation characteristics of the floor. It is preferable to have lower level of variations in the properties of the floor boards for trailer flooring application. The inventive way to achieve lower variation and a higher degree of uniformity of the floor properties across a section of the floor board is by arranging the dissimilar types of wood in a pattern to form the hybrid floor board. The ability to visually differentiate oak and birch strips in the production assembly stage to make a pattern of strips and produce flooring with selective, more controllable and relatively more uniform characteristics, such as the strength, bending modulus, unit weight of floorboard and appearance is an advantage. Similarly, oak and soft maple can be mixed to make a pattern in the hybrid floorboard and to reduce cost and derive less variation in the properties. An inventive matter disclosed herein is the hybrid wood board having two types of wood strips arranged in a pattern and the cost of one type of wood strips is at least about 10% lower than the cost of the second type of wood strips. Another inventive matter disclosed herein is the hybrid wood board having two types of wood strips arranged in a pattern and the average specific gravity of one type of wood is at least about 5% higher than the average specific gravity of the second type of wood strips. Alternatively, the hybrid wood flooring may comprise one or more sections composed of a type of hardwood strips having an average specific gravity of 0.6 or higher and another type of hardwood strips with an average specific gravity less than 0.6, the specific gravity measured at 12 percent moisture content and at least one type of hardwood strips are arranged in a pattern.

One of the particular inventive matters disclosed herein is the selective mixing and patterning of poplar and oak strips in a hybrid floor board. These wood strips can be easily identified by the typical factory worker engaged in the assembly of the oak and poplar wood strips to make a floor board. Ability to identify the wood strips allows the workers to arrange the strips of wood in a desired pattern, which pattern is useful to control the mechanical properties or aesthetic quality or wear characteristics or installation of floor screws to attach the floorboard to cross-members of trailer. It is also possible to build hybrid floor boards where a first area of the board is composed of oak and poplar in a given pattern and another area is composed of oak only. Such an attribute is useful because the natural decay resistance and hardness or ability to resist indentation of oak is higher than poplar. The rear area of the trailer floor may be subjected to greater damage from moisture or water and by cargo-loading of the trailer by lift trucks. Hybrid floor with a rear area of oak is useful in this case.

FIG. 1A described above is a portion of a traditional wood floor board (prior art) used in vehicular flooring having one or more types of wood strips in random arrangement. The wood strips are typically red and white oak and these strips are mixed in any proportion in the oak floor board in any given area of the board. The red oak strips are not arranged in a set manner relative to the white oak. Red and white oaks are considered to be one type of wood for making trailer flooring. Sometimes, the oak floors are made with white oak only or red oak only. Maple floors are also used in trailers and they may comprise hard maple strips only. Soft maple and birch or another type of wood strip may be mixed with the hard maple strips in a random arrangement and in any proportion. Since hard maple, soft maple and birch have a similar appearance and not readily distinguishable for production scale assembly of strips, these are considered to be just one type of wood. FIG. 1B is a portion of a traditional wood floor 20 in a trailer, the floor comprising one or more traditional floor boards 1 assembled side-by-side by means of shiplap joint 8 between adjacent boards.

Figure 2:
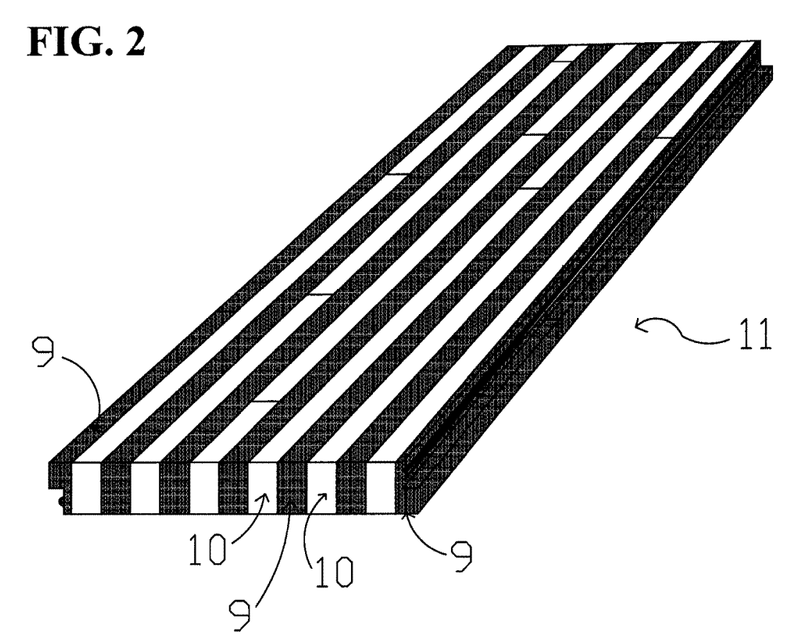
FIG. 2 is a portion of a hybrid wood floor board having two types of wood strips in alternating pattern of rows and the same type of wood strips at the edges of board.

The embodiments of this disclosure are described below and schematically represented in FIG. 2 to FIG. 7. FIG. 2 is a portion of a hybrid wood floor board it having two types of wood strips in alternating pattern of rows of strips and the same type of wood strip is used at the edges of board. A first type of wood strips 9 may be red oak or white oak or both red and white oaks or hard maple or hickory or any combination of them arranged along several rows of strips. A second type of wood strips 10 along the rows in the alternating pattern with 9 may be poplar or birch or soft maple or ash or beech or a combination of them. The first type of wood strips has a higher average cost or a higher average density than the second type of wood strips.

Figure 3:
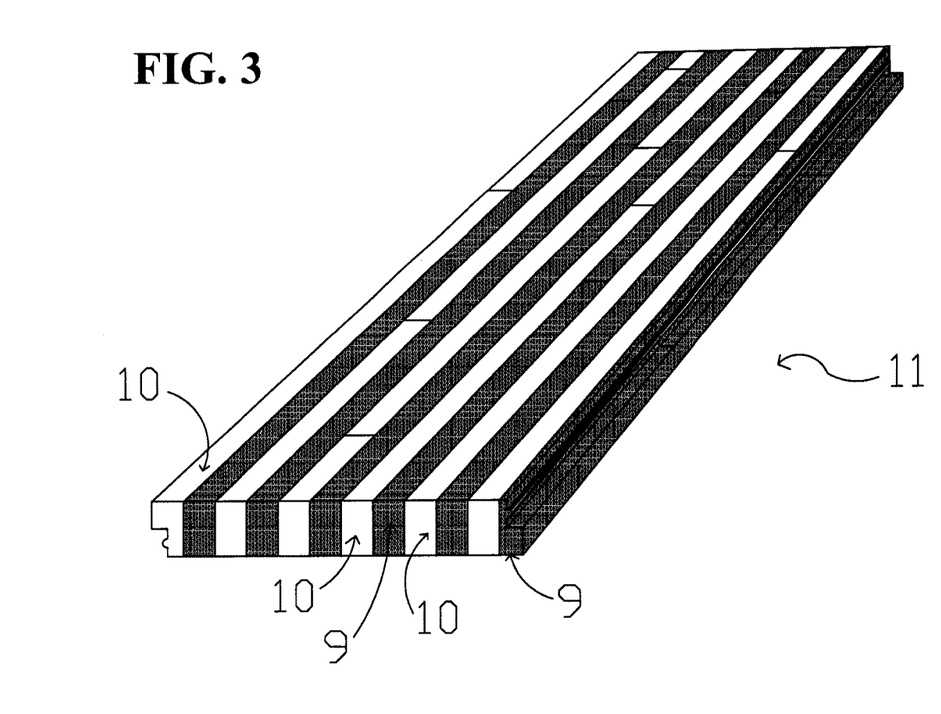
FIG. 3 is a portion of a hybrid wood floor board having two types of wood strips in alternating pattern of rows and two types of wood strips at the edges of board.

FIG. 3 is a portion of a hybrid wood floor board 11 having two types of wood strips in alternating pattern of rows of strips and dissimilar types of wood strips are at the edges of board. A first type of wood strips 9 may be hard maple or oak or hickory or a combination of them arranged along rows of strips. A second type of wood strips 10 in the alternating pattern with 9 can be poplar or birch or soft maple or ash or beech or a combination of them. The first type of wood strips has a higher average cost or a higher average density than the second type of wood strips.

Figure 4:
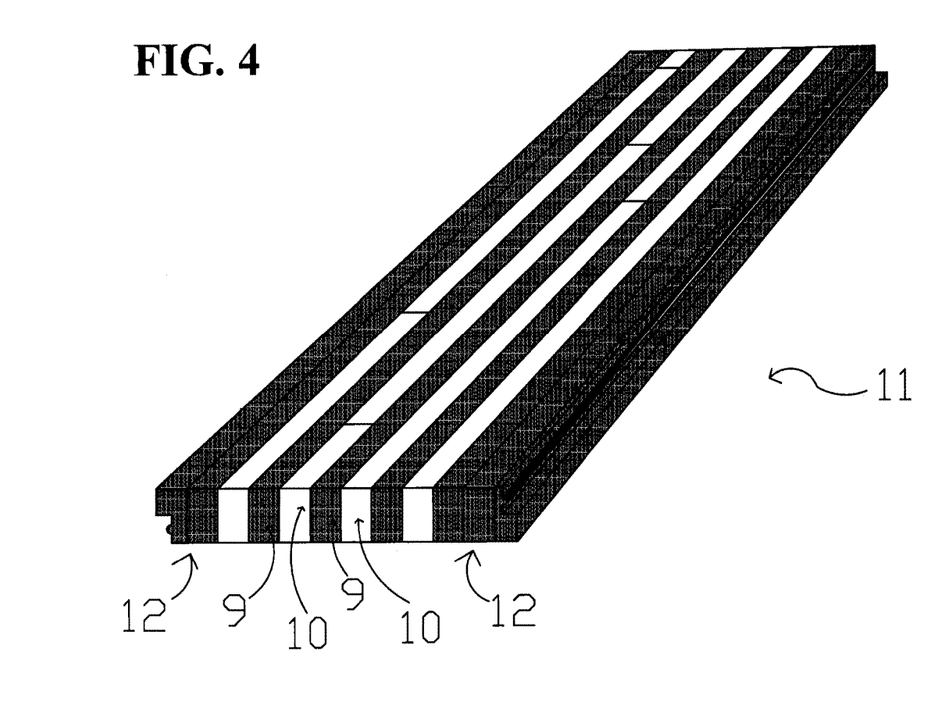
FIG. 4 is a portion of a hybrid wood floor board having two types of wood strips in alternating pattern of rows in the middle area of board and a plurality of the same type of wood strips at the edges of board.

FIG. 4 is a portion of a hybrid wood floor board 11 having two types of wood strips 9 and 10 in alternating pattern of rows of strips in the middle area of board and a plurality of rows 12 of same type of wood strips at the edges of board.

Figure 5:
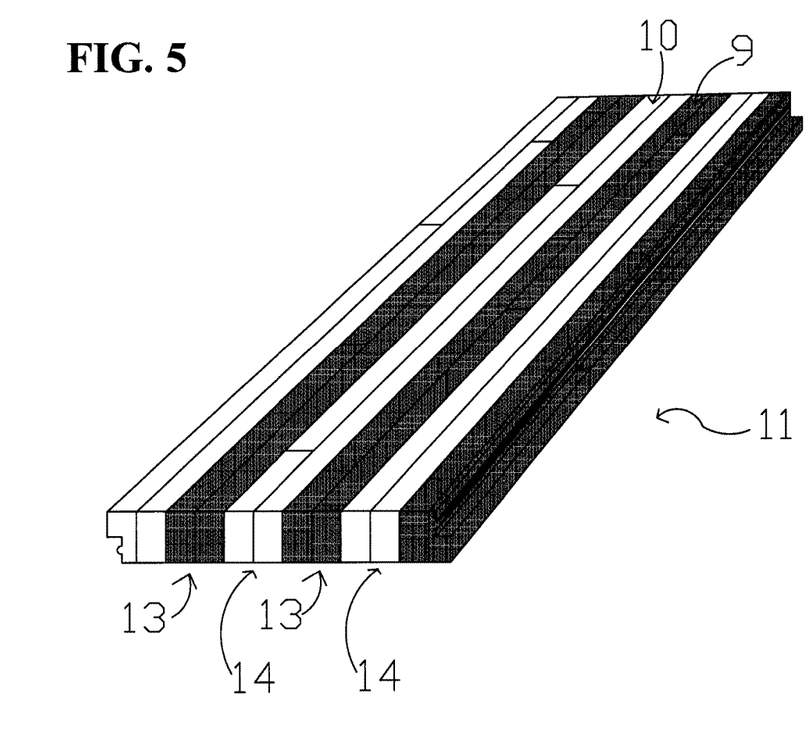
FIG. 5 is a portion of a hybrid wood floor board having two types of wood strips, wherein two adjacent rows of a first type of wood strips and two adjacent rows of a second type of wood strips are arranged in alternating pattern.

FIG. 5 is a portion of a hybrid wood floor board 11 having a first and second types of wood strips 9 and 10 and two adjacent rows of strips 13 of a first type of wood 9 and two adjacent rows of strips 14 of a second type of wood 10 are in alternating pattern at least in the middle area of board.

Figure 6:
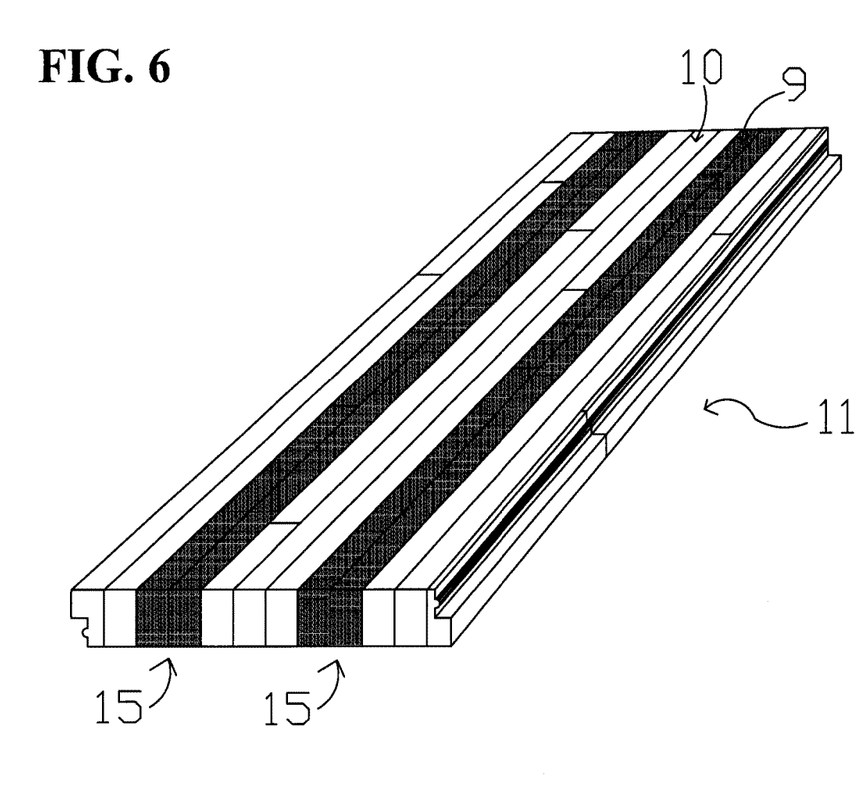
FIG. 6 is a portion of a hybrid wood floor board having two types of wood strips with one type of wood strips arranged to form one or more ribs in the middle area of the board.

FIG. 6 is a portion of a hybrid wood floor board 11 having a first and second types of wood strips 9 and 10 and two or more rows of wood strips of the first type of wood 9 are arranged in a pattern to form ribs 15 in the middle area of the board and the ribs are adjacent to rows of strips of a second type of wood 10.

Figure 7:
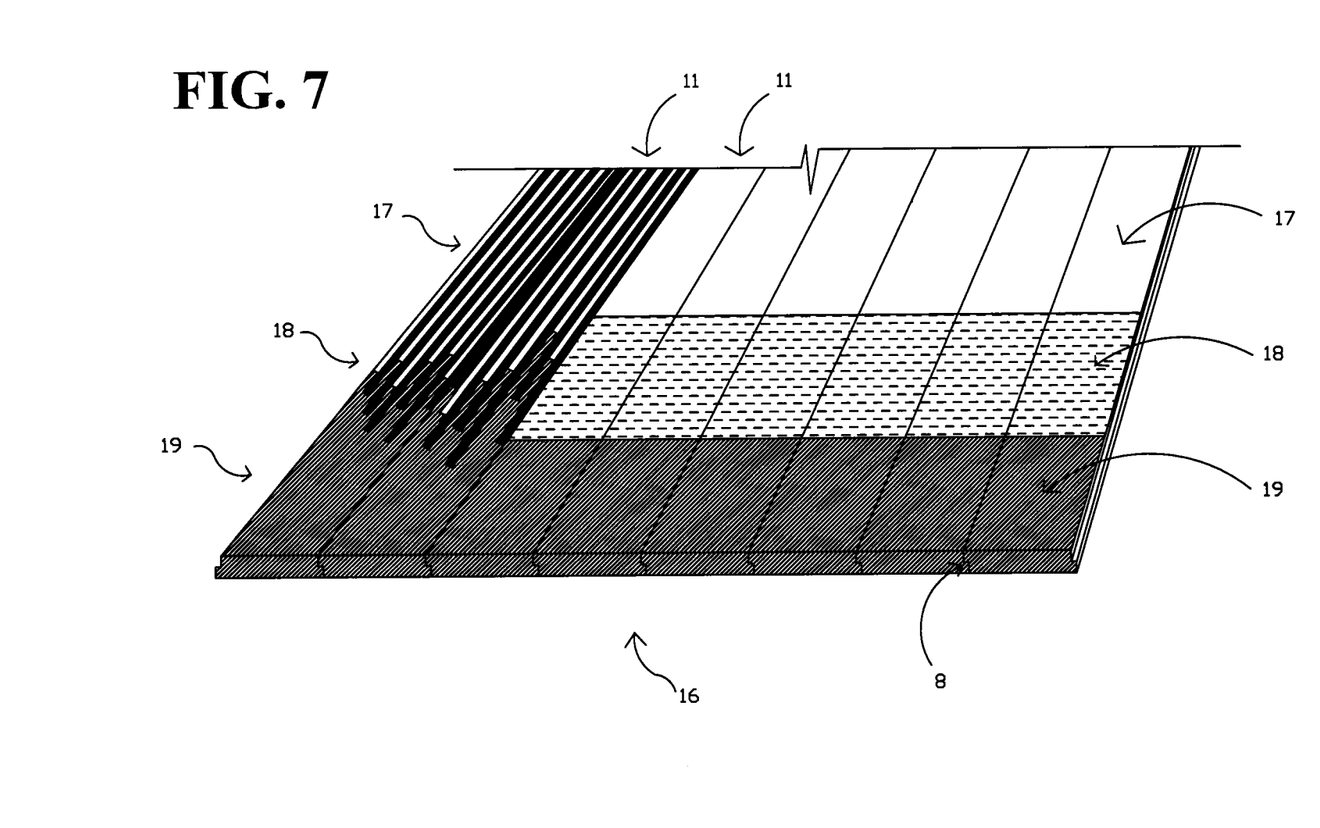
FIG. 7 is a portion of a hybrid wood floor in a trailer, wherein the floor comprises a plurality of hybrid boards and at least one board has a first area, a second area and a third area; wherein the first area has two or more types of wood strips in a pattern, the second area is a transition area and the third area has a traditional arrangement of wood strips.

FIG. 7 is a portion of a hybrid wood floor 16 in a trailer, wherein the floor comprises a plurality of hybrid boards assembled together by means of a shiplap joint 8 between adjacent boards and at least one board has a first area 17, a second area 18 and a third area 19; wherein the first area has two or more types of wood strips arranged in a pattern, the third area has wood strips in traditional random arrangement and the second area is a transition area between the first and third areas. For example, the first area may comprise a pattern of oak and poplar wood strips and the third area may comprise red oak, white oak or mixed oak. The higher hardness and decay resistance of oak may be useful in the rear section of the trailer floor close to the rear doors of trailer.

Another objective of the disclosure is the method of manufacturing of the hybrid boards. To determine if the typical factory workers could assemble strips of poplar and oak in an alternating pattern of rows during the fast paced production environment, we conducted a test run. Poplar and oak strips were ripped and sanded using the same machinery used to make traditional oak floor for trailers. The ripped strips were supplied to a group of workers who are trained in the traditional assembly of oak strips (red, white or mix of oak species) for lamination or gluing to make trailer floor. The workers were instructed to lay the oak and poplar strips in a side-by-side alternating pattern of rows for an approximately equal proportion of oak to poplar by volume in the panel. Each row of strips was allowed to be either oak or poplar and not both wood types. The wood strips were roll coated with a commercially available melamine adhesive and then transferred to the assembly station where the workers picked up the strips by hand and manually placed them on the layup conveyor to form a panel. Surprisingly, the typical factory workers were able to visually identify the strips of poplar and oak based on their appearance and assemble them in alternating pattern of rows to make panels of approximate size of 20 feet long by about 52 inches wide without many incorrect placements of the strips of wood. More than 80% of all the wood strips were correctly placed in the panel to form the alternating pattern of rows. We realized that the distinctive appearance of poplar and oak wood strips provided a unique advantage for building hybrid floor boards, which is an inventive matter related to the method of manufacturing of these floors and having other advantages such as lower weight and lower lumber cost for the hybrid boards than a traditional oak board.

The panel was ripped to make rough boards suitable for further finishing. The rough boards were machined to a final thickness of 1 5/16 inch and shiplaps were formed at the edges of board. The oak and poplar strips were arranged in alternating pattern as represented in FIG. 2 and FIG. 3. The width of the finished boards was approximately 12 inches. Randomly selected board specimen were tested to evaluate dry shear strength and wet shear strength of the glue bonds using industry standard tests for trailer flooring as set by Technology and Maintenance Council's Recommended Practice 723A (TMC RP 723A). The dry shear strength (Table 2 below) and wet shear strength (Table 3 below) exceeded the minimum shear strength requirements for trailer flooring.

TABLE 2

Dry shear test of glue bonds between wood strips

| Type of Floorboard | Thickness (inch) | Average Shear Strength (psi)* | Requirement (psi)* |
|---|---|---|---|
| Traditional Oak (typical) | 1-5/16 | 2642 | 1850 |
| Hybrid Oak-Poplar | 1-5/16 | 2127 | 1850 |

*Pounds per square inch

TABLE 3

Wet shear test of glue bonds between wood strips

| Type of Floorboard | Thickness (inch) | Average Shear Strength (psi)* | Requirement (psi)* |
|---|---|---|---|
| Traditional Oak (typical) | 1-5/16 | 1256 | 600 |
| Hybrid Oak-Poplar | 1-5/16 | 1161 | 600 |

*Pounds per square inch

The bend strengths of the floor boards were measured at a beam span of 30 inches and were found to exceed the industry requirements (Table 4 below). Samples of floor boards were evaluated for MOR (Modulus of Rupture) and MOE (Modulus of Elasticity) properties by three-point bending test at a span of 30 inches. MOR is a measure of the bending strength and MOE is a measure of resistance to bending deflection of the floor board. The MOR and MOE for oak-poplar hybrid boards were comparable to typical properties of traditional oak floorboards (Table 5 below).

TABLE 4

Bend test of floor boards

| Type of Floorboard | Thickness (inch) | Average Bend Strength (lbs)* | Requirement (lbs)* |
|---|---|---|---|
| Traditional Oak (typical) | 1-5/16 | 5407 | 3850 |
| Hybrid Oak-Poplar | 1-5/16 | 5697 | 3850 |

*Pounds

TABLE 5

Three point bend test of floor boards

| Type of floorboard | Thickness (inch) | MOR (psi)* | MOE (million psi) |
|---|---|---|---|
| Traditional Oak (typical) | 1-5/16 | 12,500 | 1.60 |
| Hybrid Oak-Poplar | 1-5/16 | 12,110 | 1.71 |

*Pounds per square inch

The weights of floor boards were measured and the weight per square foot (sqft) of the floor boards were determined (Table 6 below). The oak-poplar hybrid boards were lighter than the traditional oak boards at the same thickness of the boards. The lighter hybrid boards can save about 194 lbs (pounds) of weight compared to the traditional oak floor in a typical dry van trailer using about 380 sqft of wood flooring.

TABLE 6

Weight of floorboards and weight savings for trailer floor

| Type of Floorboard | Thickness (inch) | Unit Weight (lbs/sqft)* | Weight Saving** (lbs/sqft) | Weight Saving*** (lbs per Trailer) |
|---|---|---|---|---|
| Traditional Oak (typical) | 1-5/16 | 5.1 | — | — |
| Hybrid Oak-Poplar | 1-5/16 | 4.59 | 0.51 | 194 |

*Pounds per square foot
**Weight Saving relative to the weight of 1-5/16 inch traditional oak floor
***Weight Saving for a trailer floor with an area of 380 square feet Hybrid floor boards made with oak and poplar wood strips offer several advantages. The mechanical properties such as dry shear strength, wet shear strength and bend strength exceed the minimum requirement for trailer flooring application. Further, mixing of poplar with oak provides significant cost reduction and weight reduction for hybrid floor compared to traditional oak floor. Weight reduction allows for hauling more freight in the trailer and for improved efficiency of transportation of cargo. Alternatively, weight reduction leads to fuel savings for the truck-trailer. Alternating pattern of rows of oak and poplar strips in the floor board provides less variation in the performance characteristics of the floor such as bending strength, resistance to deflection, shear strength. Further, the alternating pattern of rows of strips has the ability to provide more consistent wear of surface and resistance to indentation across the width of the board compared to random arrangement of oak and poplar strips in the floor board. Even though poplar is not as hard as oak and has less resistance to wear and indentation, the hybrid floor made of poplar and oak provides improved performance while reducing cost and weight.

While we have shown and described several embodiments in accordance with our disclosure, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. A hybrid wood board for use in a cargo-carrying trailer floor, the hybrid wood board having a length along a major axis, a width along a minor axis, an upper surface, a lower surface and a thickness between the upper surface and lower surface, the hybrid wood board comprising:
    a plurality of wood strips, each wood strip having a length and width less than the length and width of the hybrid wood board, respectively, wherein the wood strips are arranged in side-by-side rows and glued together to form the hybrid wood board and the wood strips comprise a first type and a second type of wood strips;
    wherein the first type of wood strips comprises one or more species of hardwood selected from the group consisting of red oak, white oak, mixture of red and white oaks, hard maple, hickory, and any combinations thereof, and the first type of wood strips having a first average specific gravity; wherein the second type of wood strips comprises one or more species of hardwood selected from the group consisting of poplar, birch, beech, soft maple, ash, and any combinations thereof, and the second type of wood strips having a second average specific gravity;
    wherein the first average specific gravity is higher than the second average specific gravity; and
    wherein the first and second types of wood strips are arranged in a pattern in at least a portion of the hybrid wood board.

2. The hybrid wood board of claim 1, wherein the rows of wood strips of the first type are in an alternating pattern with the rows of wood strips of the second type in at least a portion of the board.

3. The hybrid wood board of claim 1, wherein the rows of wood strips of the first type are in an alternating pattern with the rows of wood strips of the second type in at least a portion of the board and the rows of wood strips at the edges of the portion of the board comprise the first type of wood.

4. The hybrid wood board of claim 1, wherein two adjacent rows of wood strips of the first type are in an alternating pattern with two adjacent rows of wood strips of the second type in at least a portion of the board.

5. The hybrid wood board of claim 1, wherein the first average specific gravity is higher than 0.6 and the second average specific gravity is lower than 0.6 at about 12 percent average moisture content of wood.

6. The hybrid wood board of claim 1, wherein the first average specific gravity is at least about 5% higher than the second average specific gravity.

7. A hybrid wood floor in a vehicular trailer for carrying cargo, the hybrid wood floor comprising a plurality of wood boards,
    said trailer having a front end and a rear end,
    each wood board having a length along a major axis, a width along a minor axis, an upper surface, a lower surface and a thickness between the upper surface and lower surface and two lateral edges along the major axis,
    each wood board having a first area by the front end of trailer, a third area by the rear end of trailer and a second area of transition between the first and third areas;
    one or more said wood boards comprising a plurality of wood strips, each wood strip having a length and width less than the length and width of the wood board, respectively, wherein the wood strips are arranged in side-by-side rows and glued together to form the wood board and the wood strips comprise a first type and a second type of wood strips;
    wherein the first type of wood strips comprises one or more species of hardwood selected from the group consisting of red oak, white oak, mixture of red and white oaks, hickory and hard maple, and any combinations thereof; and the second type of wood strips comprises one or more species of hardwood selected from the group consisting of poplar, birch, beech, soft maple, and ash and any combinations thereof; and
    wherein the first and second types of wood strips are arranged in a pattern in at least a portion of the first area of the wood board.

8. The hybrid wood floor of claim 7, wherein a portion of the third area of board comprises wood strips selected from the group consisting of red oak, white oak, mixed oak species, and any combinations thereof.

9. A hybrid wood floor in a vehicular trailer for carrying cargo, the hybrid wood floor comprising a plurality of hybrid wood boards of claim 1.

10. A hybrid wood board for use in a cargo-carrying trailer floor, the hybrid wood board having a length along a major axis, a width along a minor axis, an upper surface, a lower surface and a thickness between the upper surface and lower surface, the hybrid wood board comprising:
    a plurality of oak and poplar wood strips, each wood strip having a length and width less than the length and width of the hybrid wood board, respectively, wherein the wood strips are arranged in side-by-side rows and glued together to form the hybrid wood board;
    wherein the oak and poplar wood strips are arranged in a pattern in at least a portion of the hybrid wood board.

11. The hybrid wood board of claim 10, wherein rows of wood strips of oak are in an alternating pattern with rows of wood strips of poplar in at least a portion of the board.

12. The hybrid wood board of claim 10, wherein rows of wood strips of oak are in an alternating pattern with rows of wood strips of poplar in at least a portion of the board and the rows of wood strips at the edges of the portion of board are oak.

13. The hybrid wood board of claim 10, wherein two adjacent rows of wood strips of oak are in an alternating pattern with two adjacent rows of wood strips of poplar in at least a portion of the board.

14. A hybrid wood floor in a vehicular trailer for carrying cargo, the hybrid wood floor comprising a plurality of hybrid wood boards of claim 10.

\* \* \* \* \*